(12) United States Patent
Krampe et al.

(10) Patent No.: US 10,955,837 B2
(45) Date of Patent: Mar. 23, 2021

(54) METHOD AND SYSTEM FOR ERROR DETECTION AND MONITORING FOR AN ELECTRONICALLY CLOSED-LOOP OR OPEN-LOOP CONTROLLED MACHINE PART

(71) Applicant: SIEMENS AKTIENGESELLSCHAFT, Munich (DE)

(72) Inventors: Detlef Krampe, Baiersdorf (DE); Amit Verma, Erlangen (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 15/278,525

(22) Filed: Sep. 28, 2016

(65) Prior Publication Data

US 2017/0090468 A1 Mar. 30, 2017

(30) Foreign Application Priority Data

Sep. 29, 2015 (EP) .................................... 15187247

(51) Int. Cl.
*G05B 23/02* (2006.01)
*G06F 17/18* (2006.01)
(Continued)

(52) U.S. Cl.
CPC ..... *G05B 23/0254* (2013.01); *G05B 19/4065* (2013.01); *G06F 16/245* (2019.01);
(Continued)

(58) Field of Classification Search
CPC .... G06F 11/0751; G06F 17/18; G06F 16/245; G06F 16/285; G05B 11/42; G05B 17/02;
(Continued)

(56) References Cited

U.S. PATENT DOCUMENTS 5,566,092 A * 10/1996 Wang ................. G05B 19/4184
700/159
6,456,898 B1 * 9/2002 Modesto ................ B23Q 15/02
340/679
(Continued)

FOREIGN PATENT DOCUMENTS

CN 1233325 A 10/1999
CN 102914990 A 2/2013
(Continued)

*Primary Examiner* — John E Breene
*Assistant Examiner* — Jeffrey P Aiello
(74) *Attorney, Agent, or Firm* — Henry M. Feiereisen LLC

(57) ABSTRACT

In a method for error detection and monitoring an electronically closed-loop or open-loop controlled machine part, operating parameters and monitoring parameters of machine parts are recorded and stored. A comparison group of comparable machine parts and comparable operating parameters is determined based on the recorded and stored operating parameters and a machine part to be compared. A statistical analysis procedure is used for creating a threshold value based on the determined comparison group, and for detecting a variance of at least one state or at least one of the monitoring parameters based on the threshold value. The variance is assigned to the machine part.

16 Claims, 2 Drawing Sheets

(51) Int. Cl.
*G06F 16/245* (2019.01)
*G06F 16/28* (2019.01)
*G05B 19/4065* (2006.01)

(52) U.S. Cl.
CPC ............ *G06F 16/285* (2019.01); *G06F 17/18* (2013.01); *G05B 2219/32233* (2013.01); *G05B 2219/32234* (2013.01)

(58) Field of Classification Search
CPC .............. G05B 23/024; G05B 19/4065; G05B 2219/32233; G05B 2219/32234; G05B 23/0254; G01R 31/343
USPC ............ 340/540, 679; 700/10, 29, 108–109; 702/185, 179–183; 714/E11.197; 703/2
See application file for complete search history.

(56) References Cited

U.S. PATENT DOCUMENTS

| | | | |
|---|---|---|---|
| 6,804,563 B1* | 10/2004 | Lafaye de Micheaux | G06Q 10/06 700/51 |
| 7,742,834 B2* | 6/2010 | Matsushita | G05B 19/41875 438/5 |
| 9,835,106 B2 | 12/2017 | Bogatzki et al. | |
| 2002/0052712 A1* | 5/2002 | Voser | G05B 17/02 702/182 |
| 2003/0061008 A1* | 3/2003 | Smith, Jr. | G05B 23/0283 702/188 |
| 2004/0138772 A1* | 7/2004 | Barman | G05B 19/4097 700/97 |
| 2004/0260431 A1* | 12/2004 | Keenan, Jr. | G05B 15/02 700/295 |
| 2007/0109301 A1* | 5/2007 | Smith | G05B 23/0254 345/440 |
| 2008/0091383 A1* | 4/2008 | Ueno | G05B 23/0256 702/185 |
| 2008/0137550 A1* | 6/2008 | Jurca | G06Q 10/10 370/252 |
| 2013/0018603 A1 | 1/2013 | Bogatzki et al. | |
| 2014/0070959 A1 | 3/2014 | Bhargava et al. | |
| 2014/0257543 A1* | 9/2014 | Rhodes | G05B 19/4097 700/97 |
| 2015/0153728 A1* | 6/2015 | Eckley | G05B 19/41875 700/97 |
| 2015/0377745 A1* | 12/2015 | Al-Najjar | G07C 3/00 702/183 |

FOREIGN PATENT DOCUMENTS

| | | |
|---|---|---|
| CN | 104198138 A | 12/2014 |
| DE | 102010063134 A1 | 6/2012 |
| DE | 102012223249 A1 | 6/2014 |

* cited by examiner

METHOD AND SYSTEM FOR ERROR DETECTION AND MONITORING FOR AN ELECTRONICALLY CLOSED-LOOP OR OPEN-LOOP CONTROLLED MACHINE PART

CROSS-REFERENCES TO RELATED APPLICATIONS

This application claims the priority of European Patent Application, No. EP15187247.0, filed Sep. 29, 2015, pursuant to 35 U.S.C. 119(a)-(d), the disclosure of which is incorporated herein by reference in its entirety as if fully set forth herein.

BACKGROUND OF THE INVENTION

The invention relates to a method and a system for error detection and monitoring for an electronically closed-loop or open-loop controlled machine part for detecting at least one state based on operating parameters or a monitoring parameter.

The following discussion of related art is provided to assist the reader in understanding the advantages of the invention, and is not to be construed as an admission that this related art is prior art to this invention.

In electronically closed-loop or open-loop controlled machine parts, it is usual in accordance with the prior art for the machine part or the device containing the machine part to be operated until a state or a monitoring parameter is outside the target range. In this case, it is possible because of the detection of a state or the presence of a measured variable the monitoring parameters are changed in order to improve the operation of the device. Industrial electronically closed-loop or open-loop controlled machine parts can be e.g. pumps, motors, robots, cranes, etc., or machine parts such as frequency converters, programmable logic conductors, etc.

Error detection generally entails taking various measurements for a plurality of states. However, the very quantity of such measurements often represents a significant obstacle in terms of their effective use in searching for errors. In total several hundred such measurements may be present, of which only one key measurement discloses the true cause of a problem.

None of the other measurements unconditionally indicates the identity of this key measurement. Thus, the successful identification of the key measurement is determined entirely by chance and depends on an opportune time-point or an extensive and time-consuming examination of each available measurement. Furthermore, until now there has not been an effective way of presenting a summary of such measurements.

Normally, the error detection is performed by analyzing a set of parameters/measured values. For example, for error detection of an electric motor a temperature analysis, the vibrations at various points, the electric current and the energy consumption, etc. are measured. The analysis can be based on a simple threshold value/limit value or on complex artificial intelligence algorithms. In addition to the aforementioned problems, the following two basic problems emerge in the prior art:

Firstly, it is difficult to determine the (initial) monitoring configuration. This means that when a machine is to be monitored the correct threshold values must be set for the different parameters monitored. For example, a monitoring system for a motor must be configured such that an alarm is, when the current drawn by a motor exceeds a particular threshold value, for example 2.2 amperes. Since similar machine parts/machines cannot be installed under the same operating conditions, it may be that the threshold values are different, even for similar machine parts. For e.g. the motor that runs in a warm environment, a higher temperature threshold is probably set than for a motor that runs in an air-conditioned environment.

Secondly, a continuous adjustment of the monitoring configuration over the service life of the machine part is necessary. As the machine parts age, i.e. over the time during which the machine is operated, the threshold values for the monitoring parameters also change. For example, for a motor with e.g. 1000 operating hours a higher threshold value for vibrations should be set than for a new motor. Therefore, the monitoring configuration must be readjusted at certain intervals.

The current procedure is that the (initial) monitoring configuration is determined mainly statically and only at the outset. The (initial) monitoring configuration and the adjustment of the monitoring configuration over the service life of the machine part in this case is found merely as a function of the different machine parts and regardless of the operational parameters (referred to below as operating parameters). Influencing factors such as age of the machine, operating conditions of the machine etc. have not been taken into account until now.

It would therefore be desirable and advantageous to provide an improved method and a system for error detection and monitoring for an electronically closed-loop or open-loop controlled machine part to obviate prior art shortcomings.

SUMMARY OF THE INVENTION

According to one aspect of the present invention, a method for error detection and monitoring of an electronically closed-loop or open-loop controlled machine part includes recording and storing operating parameters and monitoring parameters of machine parts, determining a comparison group of comparable machine parts and comparable operating parameters based on the recorded and stored operating parameters and a machine part to be compared, using a statistical analysis procedure for creating a threshold value based on the determined comparison group, and using the statistical analysis procedure for detecting a variance of at least one state or at least one of the monitoring parameters based on the threshold value, and assigning the variance to the machine part.

According to another aspect of the invention, a system for error detection and monitoring of an electronically closed-loop or open-loop controlled machine part includes first means for recording and storing operating parameters and monitoring parameters of machine parts, second means for determining a comparison group of comparable machine parts and comparable operating parameters based on the recorded and stored operating parameters and a machine part to be compared, a statistical analysis procedure unit for creating a threshold value based on the comparison group, and detecting a variance of at least one state or at least one of the monitoring parameters based on the threshold value, and third means for assigning the variance to the machine part.

In accordance with the present invention, a group of comparable machine parts can now be used as an initial level for assessing the individual machine parts in a group as regards error detection in respect of the monitoring parameters and as regards the operating parameters.

Using the method and system of the invention described above, the threshold value and the configuration can advantageously be calculated dynamically, and thus the variance, can be better determined, without the machine part having to be known precisely. In addition, the monitoring configurations do not have to be adjusted/calibrated manually over time. All factors such as age, wear, etc. of the machine are taken into account by the invention, i.e. the inventive group-based approach, or are included in the calculation. Thus safe and improved operation of the machine throughout its service life is possible.

The provision of a group-based approach, thus represents an important development as regards error detection and state monitoring of machines in different systems.

According to another advantageous feature of the present invention, the operating parameters and/or the monitoring parameters may be stored in a cloud, where the application/processing can take place, e.g. by an external supplier. Local storage on a networked or non-networked computer is of course also possible.

Advantageously, the operating parameters can be recorded and stored at a time when commissioning the machine part. This can be done manually by an operator, or can be carried out automatically by sensors. The operating parameters can also be recorded and stored once or continuously.

According to another advantageous feature of the present invention, there may be at least two machine parts in a comparison group, which are not operated at the same location.

According to another advantageous feature of the present invention, the determination of the comparison group can be carried out based on a comparison group algorithm, where a different comparison group algorithm is used for different machines. This can furthermore be weighted.

According to another advantageous feature of the present invention, the type and, optionally, the extent of the variance can be determined. This means counter-measures can be initiated more easily. Thus, in the event of a serious variance the machine part or the machine can be shut down immediately. The machine part can also continue to be operated with changed or restricted monitoring parameters. Thus e.g. at high temperatures the speed of a motor is reduced/adjusted following a corresponding adjustment of the monitoring parameters, in order to ensure reliable operation.

According to another advantageous feature of the present invention, the statistical analysis procedure can determine a threshold value for each monitoring parameter and the variance can be determined based on a comparison of the monitoring parameter with the threshold value. The analysis procedure can be any suitable analysis procedure and can also have weighted factors.

According to another advantageous feature of the present invention, an error function at least of the machine part can be calculated, and via the statistical analysis procedure, a function can be determined as a threshold value, in which, the machine part is in operation without any variance, i.e. without error. It should be noted here that the machine or the machine part runs below or with the respective operating parameters without errors or without variance.

BRIEF DESCRIPTION OF THE DRAWINGS

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
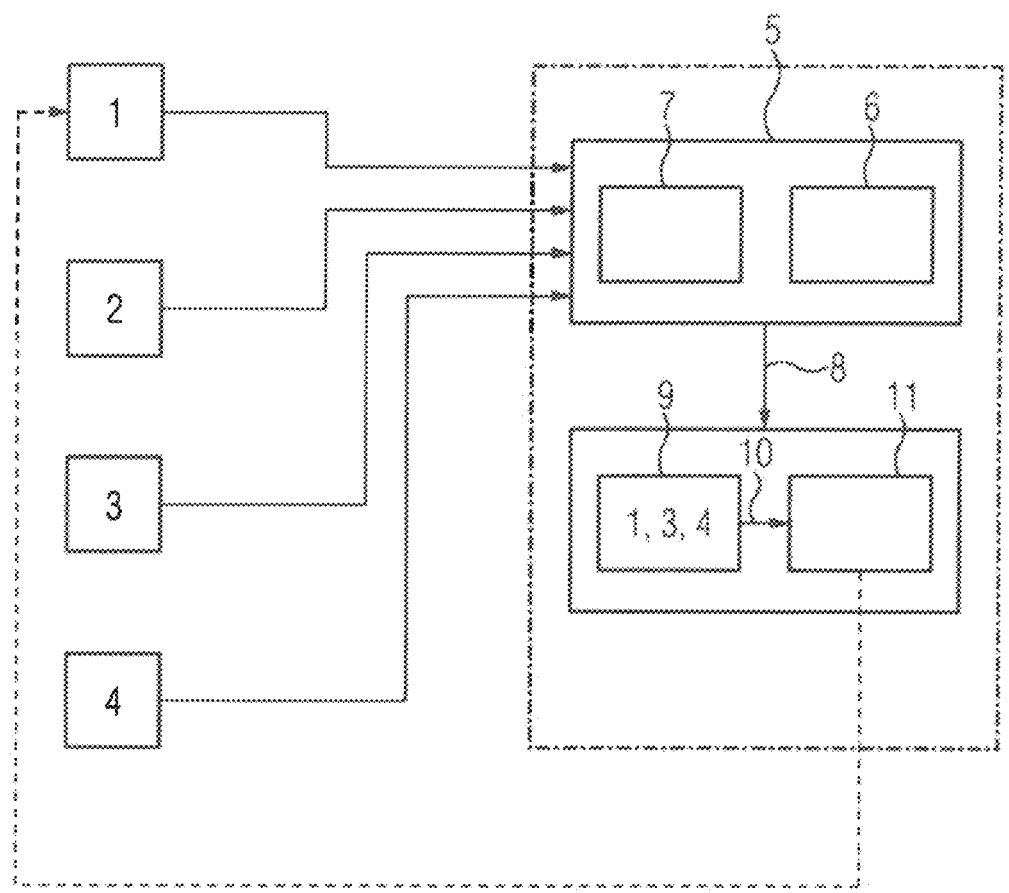
FIG. 1 schematically illustrate a method for error detection and monitoring for an electronically closed-loop or open-loop controlled machine part in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing and in particular to FIG. 1, there is shown a number of machine parts 1 to 4 to report their data, i.e. the operating parameters 6 and the monitoring parameters 7 in the case of a database 5, via suitable means. The database 5 stores the operating parameters 6 and the monitoring parameters 7. The operating parameters 6 can in this case be recorded and stored, in particular at the time of commissioning. The recording can for example be performed using sensors, or the operating parameters 6 can also be input manually by the operator.

A comparison grouping algorithm 8 determines a comparison group 9 of comparable machine parts and comparable operating parameters based on the recorded operating parameters 6 and the machine part. This machine part, to be compared, is characterized here by the number 1. The machine parts 3 and 4 are used here as comparable machine parts. When the comparison group is now formed, a threshold value 11 is calculated based on a statistical analysis procedure 10, e.g. by the above function. With the aid of the threshold value 11 errors or variances in the relevant monitoring parameter 7 of the machine part 1 can now be established. With the aid of the variances e.g. maintenance can be arranged, or the machine part 1 can be operated using other parameters. The same process can of course be used analogously with the machine parts 3 and 4. An alarm can also be output/displayed when the variance is too high.

Figure 2:
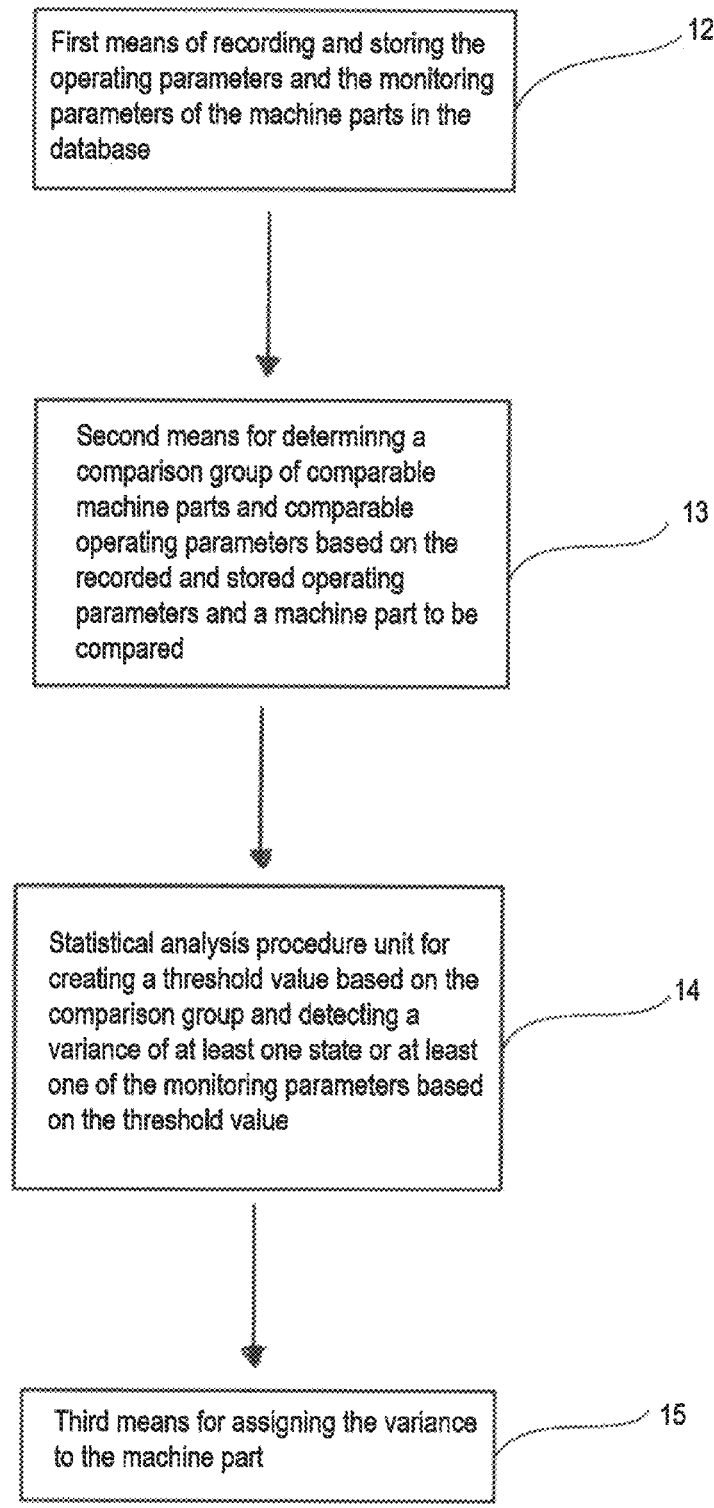
FIG. 2 is a block diagram showing the relationship and operation of a system for error detection and monitoring for an electronically closed-loop or open-loop controlled machine part in accordance with the present invention.

FIG. 2 shows a block diagram and describes the aforementioned suitable means for reporting the data of the machine parts 1 to 4 in accordance with an embodiment of the system of the present invention. In this respect, the system has first means 12 configured to record and store the operating parameters 6 and the monitoring parameters 7 of the machine parts 1 to 4 in the database 5. The system further encompasses second means 13 configured to determine a comparison group of comparable machine parts 1 to 4 and comparable operating parameters 9 based on the recorded and stored operating parameters 6 and a machine part to be compared. A statistical analysis procedure unit 14 is subsequently used for first creating a threshold value 11 based on the comparison group 9, followed by, detecting a variance of at least one state or at least one of the monitoring parameters 7 based on the threshold value 11. Finally, the system is composed of third means 15 configured to assign the variance to the machine part.

All factors such as age, wear, etc. of the machine are now taken into account by the invention, or are included in the calculation. The operating parameters are also inventively taken into consideration. Thanks to the inventive group-based approach, simple error detection is possible with minimum effort.

In a first step, the operating parameters and the monitoring parameters of the monitored machine parts are initially inventively recorded and stored. This means that in addition to the monitoring parameters, the operating parameters are recorded and, can therefore be used to assess a variance. These operating parameters can e.g. be environmental parameters, location, type of load, type of use, etc. An example that can be cited of a monitoring parameter is temperature, etc. This information can be stored in a local database which is located e.g. in situ or is stored in a cloud. In this case, the operating parameters can be recorded at the time of commissioning by a storage unit or a process unit having a storage unit. In other words, the recording of the operating parameters can take place once at the time the machine or machine part is commissioned, or on a continuous basis. Likewise, it can be carried out automatically by sensors or other measuring instruments and/or manually by an operator (i.e. first means).

In a second step at least one comparison group, i.e. a family of comparable or similar machine parts with comparable or similar operating parameters can be determined based on the recorded operating parameters and the machine part.

The machine parts in a comparison group need not necessarily be at the same physical location. Some examples of grouping are given below:
i) identical or similar machine parts from a specific product family from a specific manufacturer, e.g. machine parts from a specific product family of an automotive manufacturer;
ii) machine parts from a specific product family from a specific manufacturer and the machine parts perform similar tasks (e.g. welding);
iii) machine parts of the same type, which run under identical environmental conditions, e.g. electric motors of the same type, e.g. a pump which is deployed outdoors in the open in a chemical refinery;
iv) machine parts of the same type and the same use, which however, are deployed at different customer locations, e.g. a gearbox of the same type from a specialist manufacturer for pressure applications, which is deployed at different customer locations.

It should be noted that this list is intended only for illustration and is neither complete nor definitive.

The comparison grouping algorithm for classification of the comparison groups may differ from case to case. The comparison grouping algorithm (i.e. second means) can be implemented via an EDP device or as an application in a cloud.

In a third step, a statistical analysis procedure is applied to create at least one threshold value of the comparison group and to detect variances of at least one state or one monitoring parameter based on the threshold value. The variance is then assigned to a machine part by yet another algorithm that can associate and assign items via an association unit (i.e. third means).

This is demonstrated using the following example: there is a comparison group of 'N' machine parts, in this case e.g. electric motors. The comparison group has been created as described in step two. The error detection or variance should now be performed based on a set of three monitoring parameters $T_{wi}$, $A_{si}$, $I_{wi}$. These are for example:

the motor winding temperature: $T_{wi}$
the acceleration of the clutch shaft: $A_{si}$
the current per winding: $I_{wi}$
where i=1, 2, 3, ... N.

A statistical analysis procedure is now carried out in order to detect a variance. To this end, an error function $f_i$ of each motor i=1, 2, 3 ..., N in the comparison group is calculated:

$$f_i = \alpha^* T_{wi} + \beta^* A_{si} + \pi^* I_{wi} \qquad 1)$$

and $\alpha, \beta, \pi$ represent the weightings for the motor winding temperature $T_{wi}$, the acceleration of the clutch shaft $A_{si}$ and the current per winding $I_{wi}$.

A function $f_{normal}$ is now determined, in which, the machine part is in operation without any variance, i.e. without errors.

To this end, the average values $T_{w,avg}$, $A_{s,avg}$, $I_{w,avg}$ of the monitoring parameters of all N machines in the comparison group are determined:

$$T_{w,avg} = \frac{(T_{w1} + T_{w2} + T_{w3} + \ldots T_{wN})}{N} \qquad 2)$$

$$A_{s,avg} = \frac{(A_{s1} + A_{s2} + A_{s3} + \ldots A_{sN})}{N} \qquad 3)$$

$$I_{w,avg} = \frac{(I_{w1} + I_{w2} + I_{w3} + \ldots I_{wN})}{N} \qquad 4)$$

This gives $f_{normal}$.

$$f_{normal} = \alpha^* T_{w,avg} + \beta^* A_{s,avg} + \pi^* I_{w,avg} \qquad 5)$$

The calculated value $f_{normal}$ can hence be used as a threshold value for a variance of the monitoring parameters in the comparison group.

To detect errors or variances, only the calculated error function $f_i$ of each motor N in the comparison group must hence be compared against the threshold value $f_{normal}$.

This approach can easily be generalized to more than three monitoring parameters. The example above uses a simple average analysis procedure. Further, complex statistical analysis procedures can however be used in a similar manner.

The method/system can be implemented locally on a computer, or as an application in a cloud.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A computer-implemented method for error detection and monitoring of an electronically closed-loop or open-loop controlled machine part, comprising:
recording operating parameters using sensors and storing operating parameters and monitoring parameters of machine parts in a database of a networked or a non-networked computer environment;

determining a comparison group of comparable machine parts and comparable operating parameters based on the recorded and stored operating parameters and a machine part to be compared using a computer-implemented comparison grouping algorithm;

using a statistical analysis procedure for creating a threshold value based on the determined comparison group, and using the statistical analysis procedure for detecting a variance of at least one state or at least one of the monitoring parameters based on the threshold value;

assigning the variance to the machine part using a computer-implemented algorithm configured to associate and assign items by an association unit; and outputting an alarm by an alarm system when the variance exceeds a predefined value, wherein the threshold value is dynamically determined so that the variance detection accounts for age and wear of machine parts of the comparison group of comparable machine parts, wherein upon determining the variance being above the threshold value, changing operation of the machine part responsive to changed or restricted monitoring parameters, wherein the machine part is a motor, wherein the operating parameters are environmental parameters, location, type of load, and/or type of use, and the monitoring parameters are temperature, motor winding temperature, acceleration of a clutch shaft, and/or current per winding, wherein the step of determining a comparison group of comparable machine parts includes selecting motors of a same type and a same use, or selecting motors of a same product family, or selecting motors which run under identical environmental conditions.

2. The method of claim 1, wherein the operating parameters are recorded and stored at a time of commissioning the machine part.

3. The method of claim 1, wherein the operating parameters are recorded and stored once or continuously.

4. The method of claim 1, wherein at least two machine parts in a comparison group are not operated at a same location.

5. The method of claim 1, wherein a different comparison grouping algorithm is used for different ones of the machine parts, said computer-implemented comparison grouping algorithm implemented via an electronic data processing device or as an application in a networked environment.

6. The method of claim 1, further comprising transmitting the type of the variance to the machine part.

7. The method of claim 1, further comprising transmitting the extent of the variance to the machine part.

8. The method of claim 1, further comprising continuing to operate the machine part with changed or restricted monitoring parameters.

9. The method of claim 1, wherein a threshold value is established for each of the monitoring parameters via the statistical analysis procedure, the variance being determined based on a comparison of the monitoring parameter with the threshold value, with the statistical analysis procedure having weighted factors.

10. The method of claim 1, wherein the statistical analysis procedure has weighted factors as a function of the machine parts.

11. The method of claim 1, further comprising:
calculating an error function at least of the machine part; and
using the statistical analysis procedure to determine as the threshold value a function, in which, the machine part is in operation without any variance and error.

12. The method of claim 1, wherein changing operation of the machine part responsive to changed or restricted monitoring parameters includes shutting down the machine part or arranging maintenance for the machine part.

13. A computer-implemented system for error detection and monitoring of an electronically closed-loop or open-loop controlled machine part, comprising:

first means for recording and storing operating parameters and monitoring parameters of machine parts by using sensors and/or manually by an operator and storing in a database of a networked computer;

second means for determining a comparison group of comparable machine parts and comparable operating parameters based on the recorded and stored operating parameters and a machine part to be compared by a computer-implemented comparison grouping algorithm;

a statistical analysis procedure unit for creating a threshold value based on the comparison group, and detecting a variance of at least one state or at least one of the monitoring parameters based on the threshold value;

third means for assigning the variance to the machine part by the system using a computer-implemented algorithm configured to associate and assign items by an association unit; and an alarm system outputting an alarm when the variance exceeds a predefined value, wherein the threshold value is dynamically determined so that the variance detection accounts for age and wear of machine parts of the comparison group of comparable machine parts, wherein upon determining the variance being above the threshold value, changing operation of the machine part responsive to changed or restricted monitoring parameters, wherein the machine part is a motor, wherein the operating parameters are environmental parameters location, type of load, and/or type of use, and the monitoring parameters are temperature, motor winding temperature, acceleration of a clutch shaft, and/or current per winding, wherein the second means for determining a comparison group of comparable machine parts includes selecting motors of a same type and a same use, or selectin motors of a same product family, or selecting motors which run under identical environmental conditions.

14. The system of claim 13, wherein the first means record and store the operating parameters at a time of commissioning at least the machine part to be compared.

15. The system of claim 13, wherein the statistical analysis procedure unit establishes a threshold value for each of the monitoring parameters, with the variance being determined based on a comparison of the monitoring parameter with the threshold value, said statistical analysis procedure having weighted factors.

16. The system of claim 13, further comprising fourth means for calculating an error function at least of the machine part to be compared, said statistical analysis procedure being configured to determine as a threshold value a function, in which the machine part is in operation without any variance and error by an error function of each motor.

* * * * *